United States Patent
Perumalla et al.

(10) Patent No.: US 12,168,451 B2
(45) Date of Patent: Dec. 17, 2024

(54) AUTONOMOUS SELF-DRIVING VEHICLES USER PROFILES

(71) Applicant: INTERNATIONAL BUSINESS MACHINES CORPORATION, Armonk, NY (US)

(72) Inventors: Saraswathi Sailaja Perumalla, Visakhapatnam (IN); Gautam Zalpuri, Boxborough, MA (US); Shanthan Chamala, Malvern, PA (US); Venkata Vara Prasad Karri, Visakhapatnam (IN); Sampath Kumar Pulupula Venkata, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 17/228,516

(22) Filed: Apr. 12, 2021

(65) Prior Publication Data

US 2022/0324476 A1    Oct. 13, 2022

(51) Int. Cl.
*B60W 60/00* (2020.01)
*B60W 30/182* (2020.01)
(Continued)

(52) U.S. Cl.
CPC ........ *B60W 60/001* (2020.02); *B60W 30/182* (2013.01); *B60W 40/09* (2013.01); *G06F 16/9035* (2019.01); *G08G 1/20* (2013.01)

(58) Field of Classification Search
CPC ............. B60W 60/001; B60W 30/182; B60W 40/09; G06F 16/9035; G08G 1/20; G08G 1/202
See application file for complete search history.

(56) References Cited

U.S. PATENT DOCUMENTS 10,692,371 B1 *  6/2020  Nix ..................... G08G 1/127
2017/0068245 A1   3/2017  Scofield et al.
(Continued)

FOREIGN PATENT DOCUMENTS

CN        107038610 A      8/2017
CN        111429739 A  *   7/2020

OTHER PUBLICATIONS

"Method and System for Dynamically Enabling/Disabling Autonomous Features of Autonomous Vehicles," [online] IP.com Prior Art Database Technical Disclosure, No. IPCOM000256038D, Oct. 31, 2018, 3 pg.

(Continued)

*Primary Examiner* — Isaac G Smith
*Assistant Examiner* — Nikki M Molina
(74) *Attorney, Agent, or Firm* — CUENOT, FORSYTHE & KIM, LLC

(57) ABSTRACT

A computer hardware system includes a full self-driving (FSD) assistive system for assisting a user with a trip using a FSD autonomous vehicle and hardware processing configured to initiate the following executable operations. Based upon a first user input to a computing device associated with the user, a proposed route of the trip is received. A previously-stored user profile of the user and a context of the trip is retrieved. The vehicle is searched for based upon the user profile, the proposed route, and the context. The vehicle is configured using the user profile. External sensors are polled for road conditions along the route, and the road conditions are forwarded to the vehicle. An onboard analytics device of the vehicle uses the road conditions to change a driving mode of the vehicle.

16 Claims, 6 Drawing Sheets

(51) Int. Cl.
*B60W 40/09* (2012.01)
*G06F 16/9035* (2019.01)
*G08G 1/00* (2006.01)

(56) References Cited

U.S. PATENT DOCUMENTS

| | | |
|---|---|---|
| 2017/0316516 A1 | 11/2017 | Goldman-Shenhar et al. |
| 2019/0315342 A1 | 10/2019 | Bertollini et al. |
| 2020/0363220 A1* | 11/2020 | Simoudis ............... G06Q 30/06 |
| 2021/0042668 A1* | 2/2021 | Gao ...................... G06Q 10/02 |
| 2021/0104160 A1* | 4/2021 | Gao ...................... G06Q 10/02 |
| 2022/0005140 A1* | 1/2022 | Beaurepaire ........ G06F 3/04847 |

OTHER PUBLICATIONS

"Method and System for Dynamically Managing Autonomous Vehicles Based on a Custom Event Plan," [online] IP.com Prior Art Database Technical Disclosure, No. IPCOM000256251D, Nov. 15, 2018, 2 pg.

"Autonomous Vehicle Usage Amelioration Based on Personalized Predictive Progressive Expectance, "[online] IP.com Prior Art Database Technical Disclosure, No. IPCOM000258871D, Jun. 20, 2019, 2 pg.

"Improve User Satisfaction Based on Machine Learning and User Based Analytics on Autonomous Vehicles," [online] P.com Prior Art Database Technical Disclosure, No. IPCOM000259155D, Jul. 16, 2019, 5 pg.

"Method to Set Up Crowdsourced Preferences for Ride Sharing Trips in Autonomous Vehicles," [online] IP.com Prior Art Database Technical Disclosure, No. IPCOM000260702D, 4 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

US 12,168,451 B2

AUTONOMOUS SELF-DRIVING VEHICLES USER PROFILES

BACKGROUND

The present invention relates to self-driving capability vehicles, and more specifically, to the creation, management, and use of user profiles for use with these vehicles.

Vehicles, such as automobiles, are trending to increased levels of self-driving capability. Currently, the Society of Automotive Engineers defines 6 levels of driving automation ranging from 0 (fully manual) to 5 (fully autonomous). Examples of features for different levels (also referred to herein as driving modes) includes cruise control for Level 1 (driver assistance), advanced driver assistance systems that can control both steering and speed for Level 2 (partial driving automation), and environment detection for Level 3 (conditional automation), Level 4 (high driving automation), and Level 5 (full driving automation).

As use of these types of vehicles become more widespread, the percentage of individual ownership of the vehicles is anticipated to drop. Instead, like with current ride-hailing companies, it is anticipated that many users will employ these services in addition to or as an alternative to owning their own vehicle. An alternative to the current ride-hailing companies will be companies that employ fleets of autonomous (e.g., Level 3 through Level 5) vehicles. These companies may offer vehicles on a per use basis and/or these companies may allow customers a certain amount of usage (for example, as a timeshare). Many users, however, will not engage with a single company (i.e., fleet) as each company will likely provide varying levels service and different offerings that may or may not be appropriate in certain circumstances.

SUMMARY

A method within a full self-driving (FSD) assistive system for assisting a user with a trip using a FSD autonomous vehicle and hardware processing is disclosed. Based upon a first user input to a computing device associated with the user, a proposed route of the trip is received. A previously-stored user profile of the user and a context of the trip is retrieved. The vehicle is searched for based upon the user profile, the proposed route, and the context. The vehicle is configured using the user profile. External sensors are polled for road conditions along the route, and the road conditions are forwarded to the vehicle. An onboard analytics device of the vehicle uses the road conditions to change a driving mode of the vehicle.

A computer hardware system includes a full self-driving (FSD) assistive system for assisting a user with a trip using a FSD autonomous vehicle and hardware processing configured to initiate the following executable operations. Based upon a first user input to a computing device associated with the user, a proposed route of the trip is received. A previously-stored user profile of the user and a context of the trip is retrieved. The vehicle is searched for based upon the user profile, the proposed route, and the context. The vehicle is configured using the user profile. External sensors are polled for road conditions along the route, and the road conditions are forwarded to the vehicle. An onboard analytics device of the vehicle uses the road conditions to change a driving mode of the vehicle.

A computer hardware system includes a full self-driving (FSD) assistive system for assisting a user with a trip using a FSD autonomous vehicle and hardware processing configured to initiate the following executable operations. Based upon a first user input to a computing device associated with the user, a proposed route of the trip is received. A previously-stored user profile of the user and a context of the trip is retrieved. The vehicle is searched for based upon the user profile, the proposed route, and the context. The vehicle is configured using the user profile. External sensors are polled for road conditions along the route, and the road conditions are forwarded to the vehicle. An onboard analytics device of the vehicle uses the road conditions to change a driving mode of the vehicle.

A computer program product is disclosed that comprises a computer readable storage medium having stored therein program code. The program code, which when executed by a computer hardware system including a full self-driving (FSD) assistive system for assisting a user with a trip using a FSD autonomous vehicle, causes the computer hardware system to perform the following. Based upon a first user input to a computing device associated with the user, a proposed route of the trip is received. A previously-stored user profile of the user and a context of the trip is retrieved. The vehicle is searched for based upon the user profile, the proposed route, and the context. The vehicle is configured using the user profile. External sensors are polled for road conditions along the route, and the road conditions are forwarded to the vehicle. An onboard analytics device of the vehicle uses the road conditions to change a driving mode of the vehicle.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
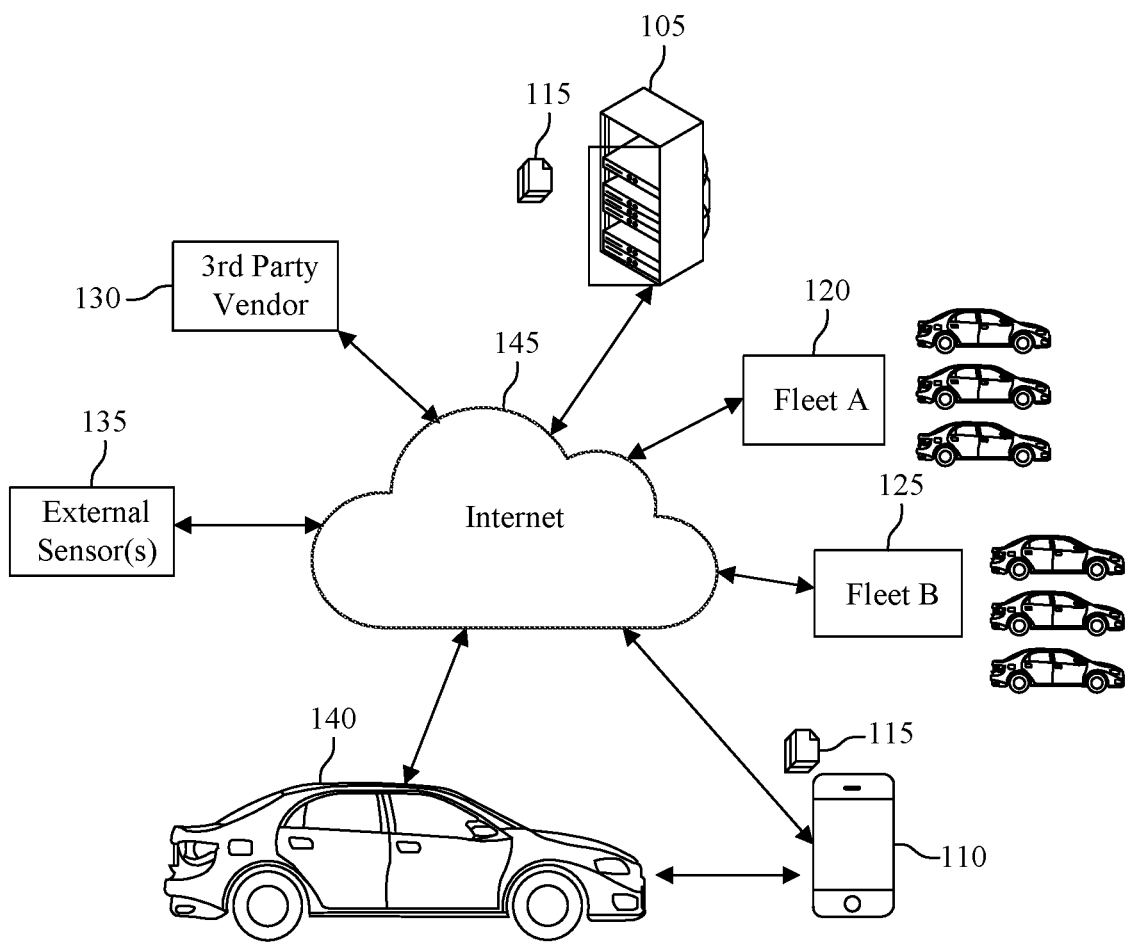
FIG. 1 is a block diagram illustrating an example architecture for use with a full self-driving (FSD) assistive system according to an embodiment of the present invention.
Figure 2:
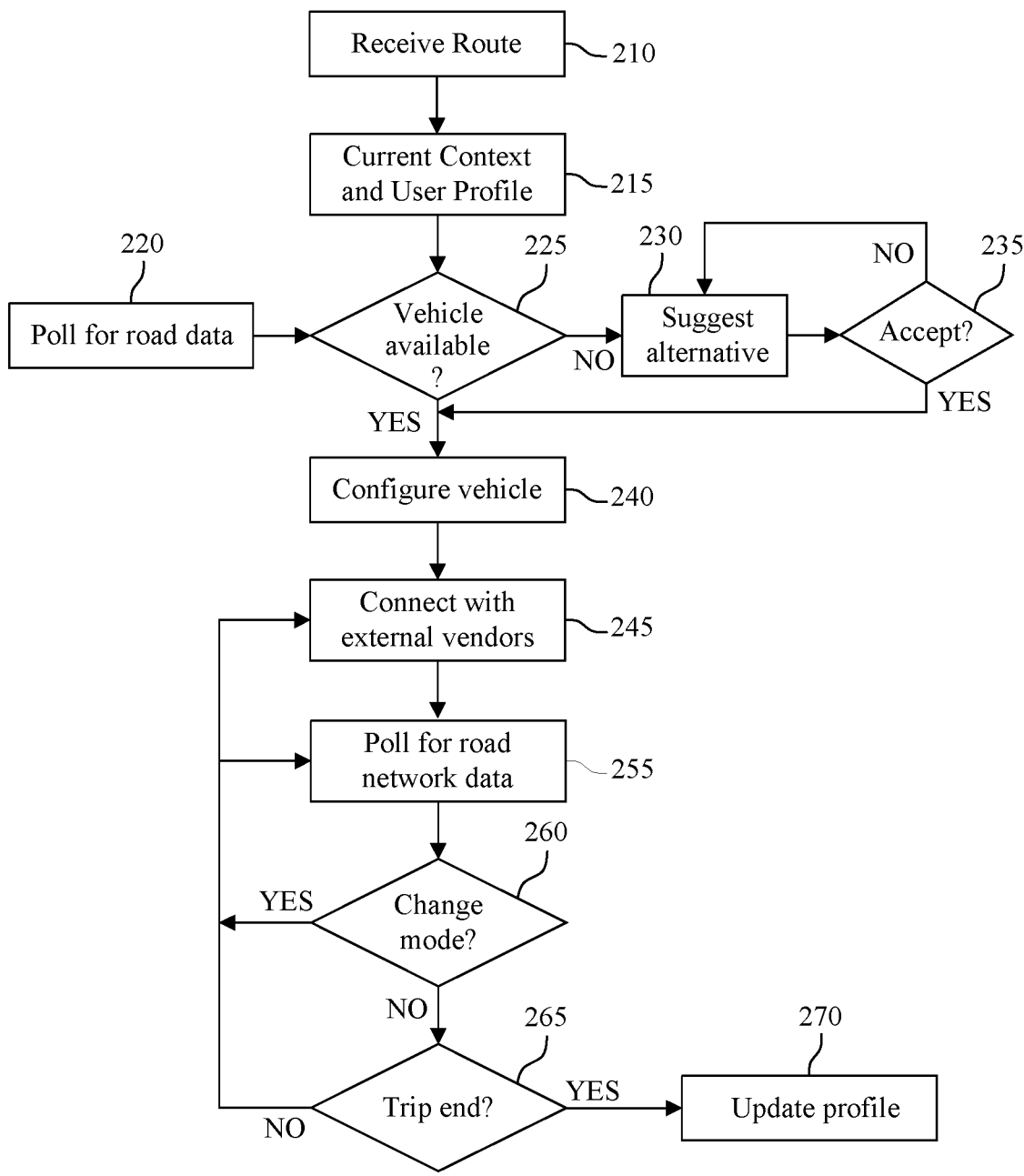
FIG. 2 is a block diagram illustrating an example method using the architecture of FIG. 1 according to an embodiment of the present invention.

Reference is made to FIG. 2 and FIG. 1, which respectively illustrate a methodology 200 of creating, managing, and using user profiles 115 across one or more fleets 120, 125 of full self-driving (FSD) autonomous vehicles 140 and an architecture 100 including a FSD assistive system 105 in which the methodology is employed according to certain aspects of the present disclosure. The term FSD autonomous vehicle 140 (subsequently referred to as just "vehicle 140"), as used herein, includes vehicles that qualify under Level 3, Level 4, or Level 5. The FSD assistive system 105 is a hardware system that is configured to interact with one or more fleet providers 120, 125 to assist a user in hailing a vehicle 140.

Referring to the methodology illustrated in FIG. 2, in 210, the FSD assistive system 105 receives a proposed route from a user, and the manner by which the proposed received is not limited. As used herein, the term "route" or "proposed route" refers to a computer data structure intended to identify a series of locations to be traveled by the vehicle 140. However, in certain aspects, the proposed route is entered by the user onto a computing device 110 associated with the user, and the proposed route is transmitted by the computing device 110 over a network 145, such as the internet or local area network, to the FSD assistive system 105. In addition to or alternative, the proposed route can be one that has been previously stored within the FSD assistive system 105.

The manner by which the user identifies a proposed route is also not limited. For example, the user can select the route using a graphical user interface of the computing device 110. This may include, for example, using an electronic pen or mouse along with a displayed map. Another example includes the computing device 110 receiving the proposed route using natural language processing of a voice command. In another example, the user could select from a route that was previously-stored on the FSD assistive system 105. Although the FSD assistive system 105 is described as identifying the route, other systems so capable can also be used.

The FSD assistive system 105 is not limited in how the route is identified. For example, the route can be identified as a beginning point and an end point. Alternatively, the route can be identified as a series of points (i.e., Point A to Point B, Point B to Point C, Point C to Point D).

The FSD assistive system 105 can also obtained the context of the trip. Although not limited in this manner, the context of the trip may be medical, business, travel, shopping, and the like or a combination of the foregoing. Depending upon the different context, the FSD assistive system 105 may map the context to a particular route and/or vehicle 140 and or driving mode capability of the vehicle 140. As another example, the user may enter a "to-do list" whereby the FSD assistive system 105 is configured to both identify locations associated with each "to-do" and to create a route based upon those identified locations. In yet another example, an IoT (internet of things) device associated with the user may provide context. For example, a smart-refrigerator may determine a lack of a particular staple and add this staple to the user's "to-do list."

Based upon the context of the trip, FSD assistive system 105 may be configured to cause a graphical user interface of the computing device 110 to present the user with alternative destinations and/or routes. By way of example, if the context of the user's trip is to go to lunch, the user may be presented with various lunch options based on past preferences and past lunch trips. As another example, if the trip occurs during lunchtime and the user has not requested a lunch stop, the FSD assistive system 105 may present the user with potential lunch locations that are accessible within the determined route.

In 215, the FSD assistive system 105 can retrieve a previously-stored user profile 115 associated with a particular user. The location from which this user profile 115 is retrieved is not limited. In certain aspects, the user profile is stored with data storage associated with the FSD assistive system 105. In certain aspects, the user profile 115 is retrieved from the computing device 110 or other device (not shown) that is associated with the user. In still further aspects, the user profile 115 (and/or portions thereof) are stored with vehicle fleets. Thus, while the user profile 115, as discussed herein, can refer to a single user profile 115 maintained by a single entity. In other aspects, different portions of the user profile 115 may be associated with different entities. For example, each of the 3rd party vendors 130, FSD assistive system 105, fleets 120, 125, and computing device 110 may include a user profile 115 that may or may not include overlapping information.

The user profile 115 can include information such as temperature settings, air quality settings, radio settings, connectivity preferences, navigation preferences, security-related settings, and payment information. Additionally, the user profile may include prior/favorite trips and/or prior/favorite destinations. Additionally information included within the user profile may include preferred fleet operators 120, 125, preferred vehicles 140, and preferred 3rd party vendors 130. Usage of a user profile 115 that can be shared across different fleet operators 120,125 and 3rd party vendors 130 can provide uses with a consistent, predictable, and desirable experience. Although not limited in this manner, certain of the contents of the user profile 115 can be automatically set, manually-adjustable, or a combination of both.

The trip trips and/or prior destinations can be both manually entered by a user or automatically determined. By way of example, the FSD assistive system 105 can analyze the GPS data of prior trips along with information about day of week and time of day and use that data to identify prior trips and to predict future trips. Although not limited in this manner but as an example, the FSD assistive system 105 may predict that the user requests a vehicle 140 every Friday after work for a drive into the countryside.

In 220, the FSD assistive system 105 can be configured to poll for road data from external sensors external sensors 135 regarding road conditions. Data from external sensors 135 can include, but are not limited, to traffic camera data, weather data, and traffic congestion data.

Figure 3:
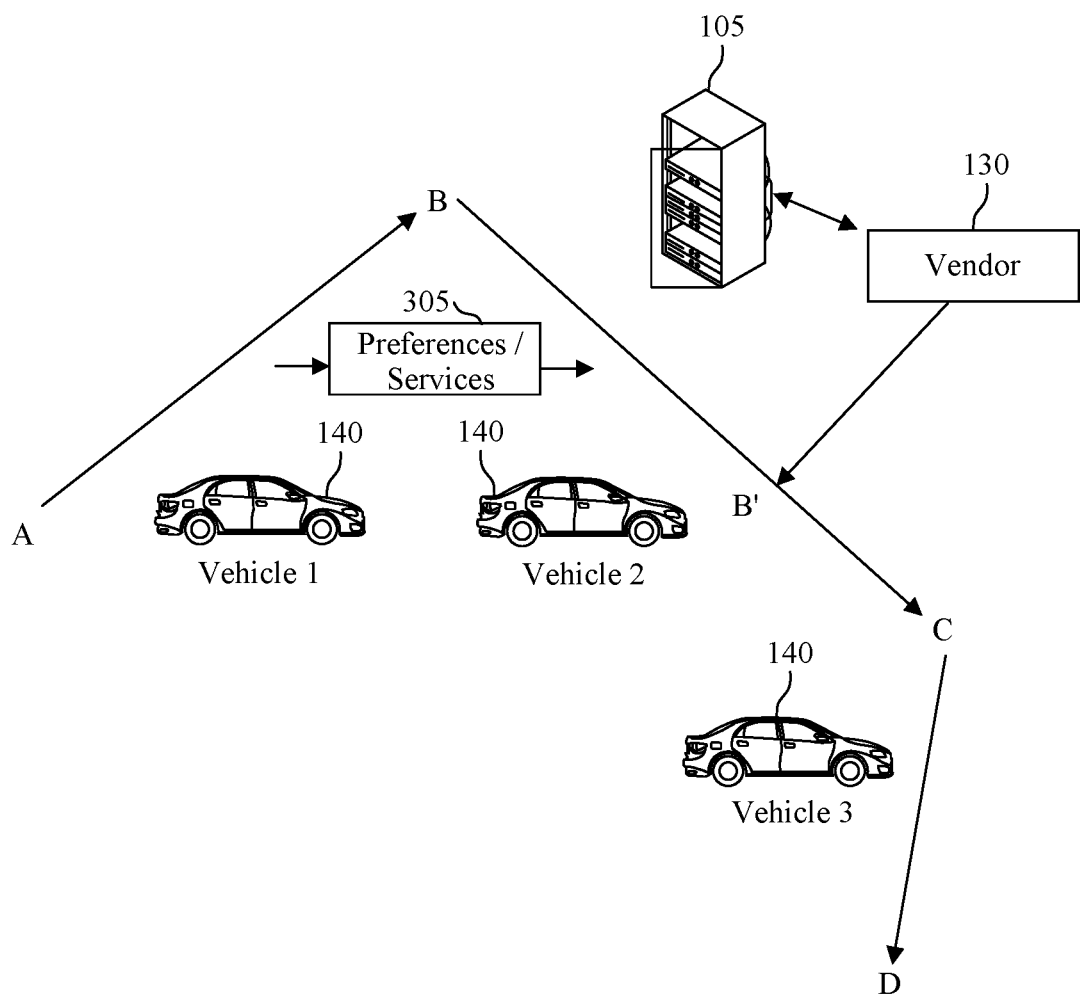
FIG. 3 is a block diagram illustrating an exemplary trip according to an embodiment of the present invention.

In 225, the FSD assistive system 105 in conjunction with the fleets 120, 125, and considering the user profile 115, road conditions, and context, may search for and identify an appropriate vehicle 140 or vehicles 140 for use during the trip. This may involve the FSD assistive system 105 identifying requirements of the trip based upon the user profile 115, road conditions, and/or the content and sending these requirements to one or more of the fleets 120, 125. Based upon responses by the one or more of the fleets 120, 125, the FSD assistive system 105 may select one or more vehicles 140 from the one or more fleets 120, 125 best suited for the trip. For example, the FSD assistive system 105 (as illustrated in FIG. 3) can determine that different vehicles 140 (e.g., vehicle 1, vehicle 2, vehicle 3) may be required at different legs of the trip. At the beginning of the trip, by way of example, the user may only need a two-seat vehicle 140 (i.e., vehicle 1) at the beginning of the trip. However, during the trip, another passenger(s) is to be picked up, which while require a vehicle 140 (e.g., vehicle 2) with an increased seating capacity, and another leg of the trip involves a trip to pick up groceries, which will require a vehicle (e.g., vehicle 3) with an increased cargo capacity. As another example, the FSD assistive system 105 may determine, from road conditions, that a four-wheel vehicle 140 is needed because of an anticipated precipitation event.

In 230, if one or more of the vehicles 140 that meeting the user's requirements based upon the determined route, context, and user profile 115 are not available, the FSD assistive system 105 can be configured to cause the computing device 110 associated with the user to present alternative vehicles 140 that could fully or at least partially meet the user's requirements. In 235, alternative vehicles 140 can continually be presented to the user until the user accepts one.

In 240, the vehicle 140 provided to the user can be configured using the user's preferences stored within the user profile 115 and based upon any additional context provided by the user. For example, whatever settings that are capable of being automatically adjusted (e.g., temperature and seat settings) of the vehicle 140 can be automatically adjusted based upon the user's profile 115. Additionally, should the user transfer vehicles 140 (e.g., from vehicle 1 to vehicle 2 or from vehicle 2 to vehicle 3 as illustrated in FIG. 3, these preferences/settings 305 can be transferred between the vehicles. Additionally, the FSD assistive system 105 can facilitate the transfer of the preferences/settings 305 even if the vehicles 140 are from different fleets 120, 125.

Additionally, the user profile 115 can be shared among computer applications that may be used by the user in the vehicle. For example, the user profile 115 could be shared with business-related applications, such a meeting applications. As other examples, the user profile 115 could be shared with media, entertainment, and navigation applications. As yet another example, the user profile 115 could be shared with a payment platform operated by one of the fleet owners 120, 125. The user profile 115 may also include a visual identity, such as an avatar or some form of digital representation of themselves, that can be shared with the fleets owners 120, 125 and third party vendors 130.

If, for example, the vehicle or one of the next vehicles, cannot accommodate the user's previously-identified preferences, an automatic alert can be provided to the user (e.g., to the user's computing device 110). Additionally, the profile 115 can be automatically adjusted, as discussed with regard to 270, to account for any adjustments that user makes while in the vehicle 140. The fleet owner 120, 125 can also be provided with an automatically-generated notification of any inability to provide a previously-identified preference.

Security of the user profile 115 can be managed, for example, through a cloud authorization and trust management system that the user can grant a degree of autonomy in order to trust applications and services that the user would require. This cloud authorization and trust management system would use AI to identify requests for data and evaluate authorization requested, and grant time bound credentials to valid requests to specific data that is required to provide services that the user prefers. These services, for example, could include preferred audio/video content providers, e.g., to play music or watch a movie during the drive, or to use high-speed secure connectivity services. Although not limited in this manner, the FSD assistive system 105 can act as the cloud authorization and trust management system. As with the preferences, the FSD assistive system 105 can be configured to facilitate transfer of these services between vehicles 140 (e.g., between vehicle 1 and vehicle 2, as illustrated in FIG. 3) even if the vehicles are from different fleets 120, 125. This transfer of services can be configured to occur at any time during the trip.

The FSD assistive system 105 can optionally cause the vehicle 140 to be configured to provide for a secure mesh network between vehicles headed in a same direction for a specific distance. In this manner one or more of these vehicles can distribute edge computing for the fleet operator 120, 125 or user applications and services. Computer management of this mesh network can be done through a dynamic private cloud established between the systems of the vehicles. This can provide for multiple applications to be used to enhance the user experience, e.g., from caching and rendering video/audio, to allowing a user perform edge compute operations locally for work (e.g., spreadsheets, design, and the like) or for play (e.g., games). The FSD assistive system 105 can be configured to manage the dynamic private cloud to determine which vehicle's compute resources can be joined to the cloud and for how long, and which must leave, and then to distribute the load across this private cloud.

In 245, the FSD assistive system 105 can optionally contact one or more 3rd party vendors 130 to provide services for the user during the trip. With reference to FIG. 3, by way of example, based upon the user's requirements (e.g., the user would like to have a pharmacy drop of a prescription or the user would like a restaurant to supply a takeout meal), the FSD assistive system 105 can cause a representative of the 3rd party vendor 130 to meet the vehicle 140 during the trip. Although not limited to a particular manner, in certain aspects, an agent of the 3rd party vendor 130 could meet the vehicle 140 at an intended destination (e.g., B or C) or at some intermediate meeting location (e.g., B'). Additionally, the FSD assistance system 105 may also call for a different autonomous vehicle (not shown) from one of the fleets (not shown) that can be used to deliver the requested item(s) to the meeting location (e.g., B').

The 3rd party vendor 130 can be contacted prior to or during the trip. For example, as party of the initial route identification, the FSD assistive system 105 (or whatever system prepares the initial route identification) may determine that the 3rd party vendor 130 is located at a position that is out of the way as compared to the other destinations (e.g., B, C, and D) for the trip. In this instance, rather than having the user travel to the 3rd party vendor 130, the 3rd party vendor 130 can meet the user somewhere convenient during the trip. As another example, the user may have forgotten a particular destination or had a sudden requirement for an item(s), realized as the trip was already initiated, for an item supplied by the 3rd party vendor 130. In this instance, the FSD assistive system 105 can contact the 3rd party vendor 130 to provide the requested item(s), with a reduced disruption of the planned trip.

The FSD assistive system 105 can also be configured to adjust the lanes in the road in which the vehicle 140 travels. For example, vehicles 140 from the same fleet 120, 125 could share the same lane so as to better enable sharing of resources, such as internet connectivity. As another example, if the user is to change vehicles (e.g., as illustrated in FIG. 3), both vehicles can be positioned within the same lane so as to facilitate the transfer by the user. In yet another example, if the vehicle 140 is to make a stop or rendezvous with another vehicle, the FSD assistive system 105 can ensure that the vehicle 140 is in the proper lane to do so.

In 255, the vehicle 140 can be configured with onboard analytics device that polls and/or automatically receives data from both onboard sensors and external sensors 135 regarding road conditions. For example, data from onboard sensors can include, but are not limited to speed, current course, and data about objects immediately surrounding the vehicle 140 using, for example, LIDAR. Data from external sensors 135 can include, but are not limited, to traffic camera data, weather data, and traffic congestion data.

The FSD assistive system 105 is also configured to facilitate the sharing of data between various vehicles 140. For example, if one vehicle 140 experiences an issue within a particular route, information about that issue can be forwarded to the FSD assistive system 105, which assign the issue a particular classification, e.g., traffic congestion, detour, road under construction and the like. This information can then be provided to other vehicles 140 along a same or similar route. These vehicles 140 can adjust their own autonomous driving software to anticipate these issues.

In 260, the onboard analytics device of the vehicle 140 uses the sensor data to make a determination whether to change driving mode—for example, enlist the user to assist driving the vehicle 140. This assistance may be in, for example, the form of having the user drive the vehicle 140 or to select from a number of provided recommendations as to how to proceed next.

As part of the analytics, a determination can be made as to a minimum time needed to request assistance from the user based upon the data that is provided. For example, if weather data predicts a precipitation event at a particular time and/or location, the vehicle 140 may inform the user, either directly or via the computing device 110 associated with the user, that the user may be required to assist the vehicle 140 at a predetermined time prior to the occurrence of the event. By way of another example, if congestion data predicts heavy traffic traveling at a high rate of speed, the vehicle 140 may inform the user that the user may be required to assist the vehicle 140 at a predetermined time prior to when the congestion will occur. The onboard analytics of the vehicle 140 may also using the sensor data to make a real-time decision to switch driving mode upon experiencing a scenario (e.g., a road under construction or a detour) not contemplated by the autonomous driving software of the vehicle 140.

These analytics may be continually performed, in real-time, throughout the trip. As an example, the trip may start using a full-autonomous driving mode, switch to a semi-autonomous driving mode in an example in which it is expected that the user may need to take control of the vehicle 140, switch again to a manual driving mode in which the user is expected to take full control of the vehicle 140 such as in a bad weather situation, and then switch back to fully-autonomous mode when the sensor data indicates no further danger. While the driving modes have been described as full-autonomous, semi-autonomous, and manual, the autonomous driving software of the vehicle 140 is not limited in this manner as the autonomous driving software may contain more, less, and/or different types of driving modes than those described above. As the analytics are performed in 260, operations 245 and 255 may also continually be performed.

In 270, the user profile 115 is updated. The updating of the user profile 115 can occur in real-time during the trip. Alternatively or additionally, the user profile 115 can be updated after the trip ends in 265. For example, the user profile 115 may be updated to include any new user preferences and/or deviations from the user's prior preferences. These preferences include, for example, the type of vehicle(s) used, trip destinations, number of passengers, seating preferences, additional services requested by the user and the like. These new user preferences and deviations can also be mapped, for example, to the context of the trip, the destinations, the particular vehicle used during the trip and the like.

The user profile 115, whether stored as part of the FSD assistive system 105 and/or associated with a particular fleet owners 120, 125, can update to reflect additional benefits earned by the user as part of using the FSD assistive system 105. For example, a fleet owner 120, 125 whose vehicle 140 was used during the trip can automatically provide the user with credits to incentive positive behavior. For example, these credits may be obtained by from responsible travel based upon IoT feedback received from the vehicle 140 and for cleanliness feedback provided by a subsequent user of the vehicle 140 and/or from a post-inspect of the vehicle 140. Additionally benefits can also be provided based upon the user's activity such as the number of miles driven and/or amount of time used. These benefits can be used by the user for additional benefits provided by the fleet owner 120, 125, provided by an operator of the FSD assistive system 105, provided by 3rd party vendors 130, and the like both before, after, and during the trip.

A user can also receive additional benefits when the user's preferences are not met and/or not accommodated by the fleet owners 120, 125 for any reason during the transit or during the trip. Additionally, the FSD assistive system 105 can keep track of the usage services provided by the vehicle 140 (e.g., Wi-Fi bandwidth) during the trip. If, for example, a fleet owner 120, 125 provides an internet package, the FSD assistive system 105 can keep track of the usage thereof and suggest changes depending upon the context of a next trip.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 4:
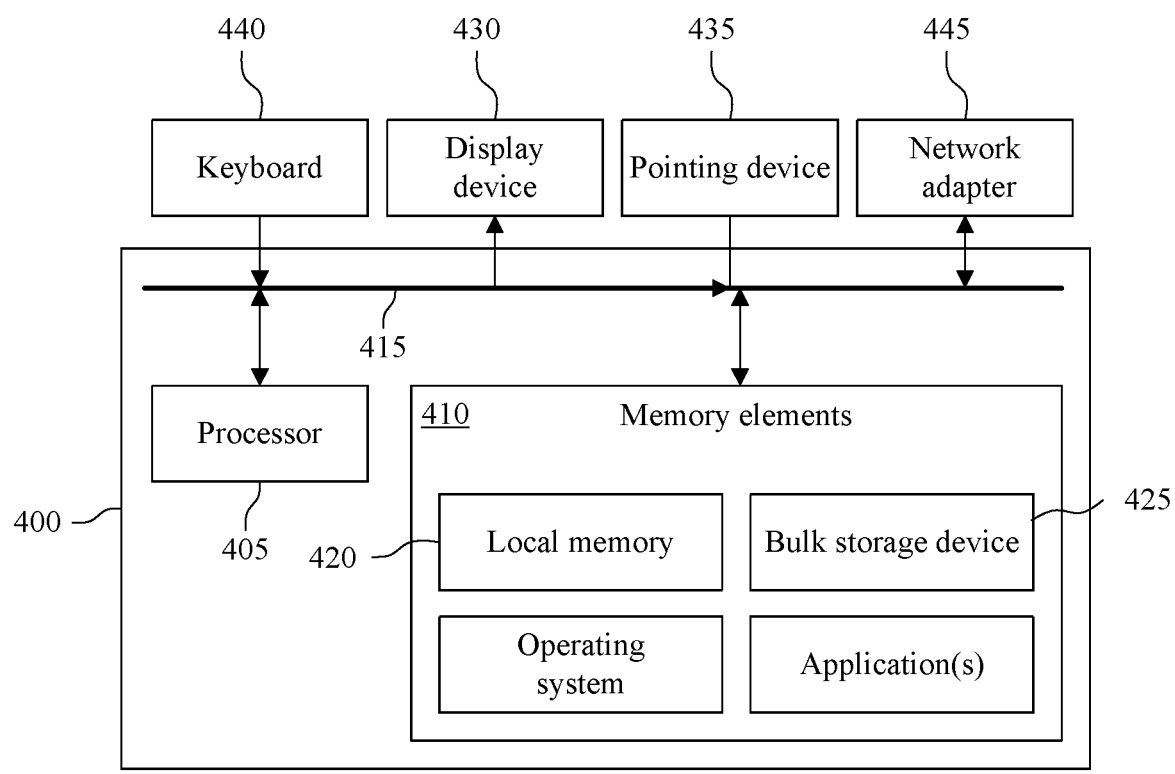
FIG. 4 is a block diagram illustrating an example of computer hardware system for implementing the scanning service of FIG. 1.

FIG. 4 is a block diagram illustrating example architecture for a data processing service 400 for executing the FSD assistive system 105. The data processing system 400 can include at least one processor 405 (e.g., a central processing unit) coupled to memory elements 410 through a system bus 415 or other suitable circuitry. As such, the data processing system 400 can store program code within the memory elements 410. The processor 405 can execute the program code accessed from the memory elements 410 via the system bus 415. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the local memory 420 and/or bulk storage device 425 during execution.

Input/output (I/O) devices such as a display 430, a pointing device 435 and, optionally, a keyboard 440 can be coupled to the data processing system 400. The I/O devices can be coupled to the data processing system 400 either directly or through intervening I/O controllers. For example, the display 430 can be coupled to the data processing system 400 via a graphics processing unit (GPU), which may be a component of the processor 405 or a discrete device. One or more network adapters 445 also can be coupled to data processing system 400 to enable the data processing system 400 to become coupled to other systems, computer systems, remote printers, and/or remote storage devices through intervening private or public networks. Modems, cable modems, transceivers, and Ethernet cards are examples of different types of network adapters 445 that can be used with the data processing system 400.

As pictured in FIG. 4, the memory elements 410 can store the components of the FSD assistive system 105 of FIG. 1. Being implemented in the form of executable program code, these components of the data processing system 400 can be executed by the data processing system 300 and, as such, can be considered part of the data processing system 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
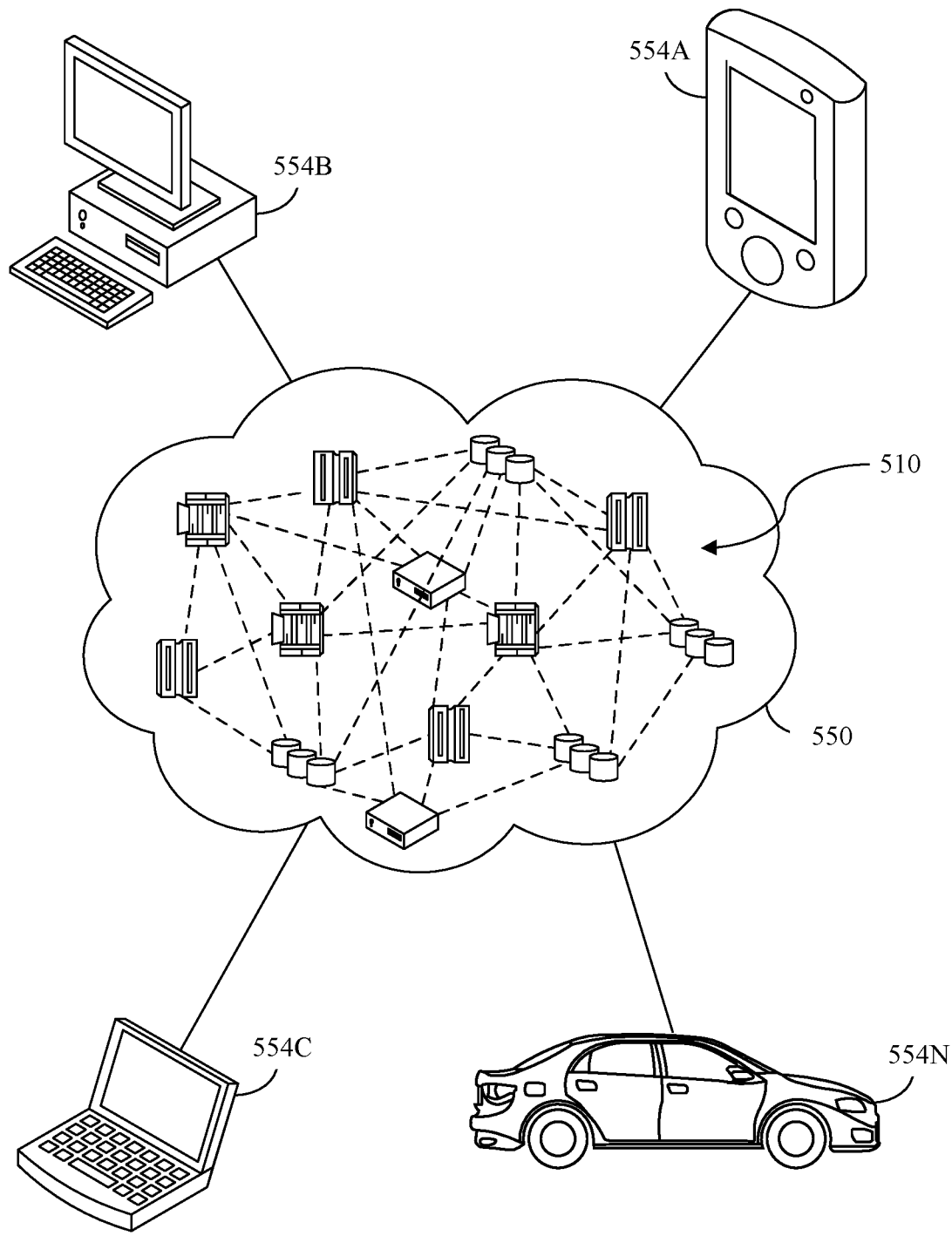
FIG. 5 depicts a cloud computing environment according to an embodiment of the present invention.

Referring now to FIG. 5, illustrative cloud computing environment 550 to be used with the FSD assistive system 105 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
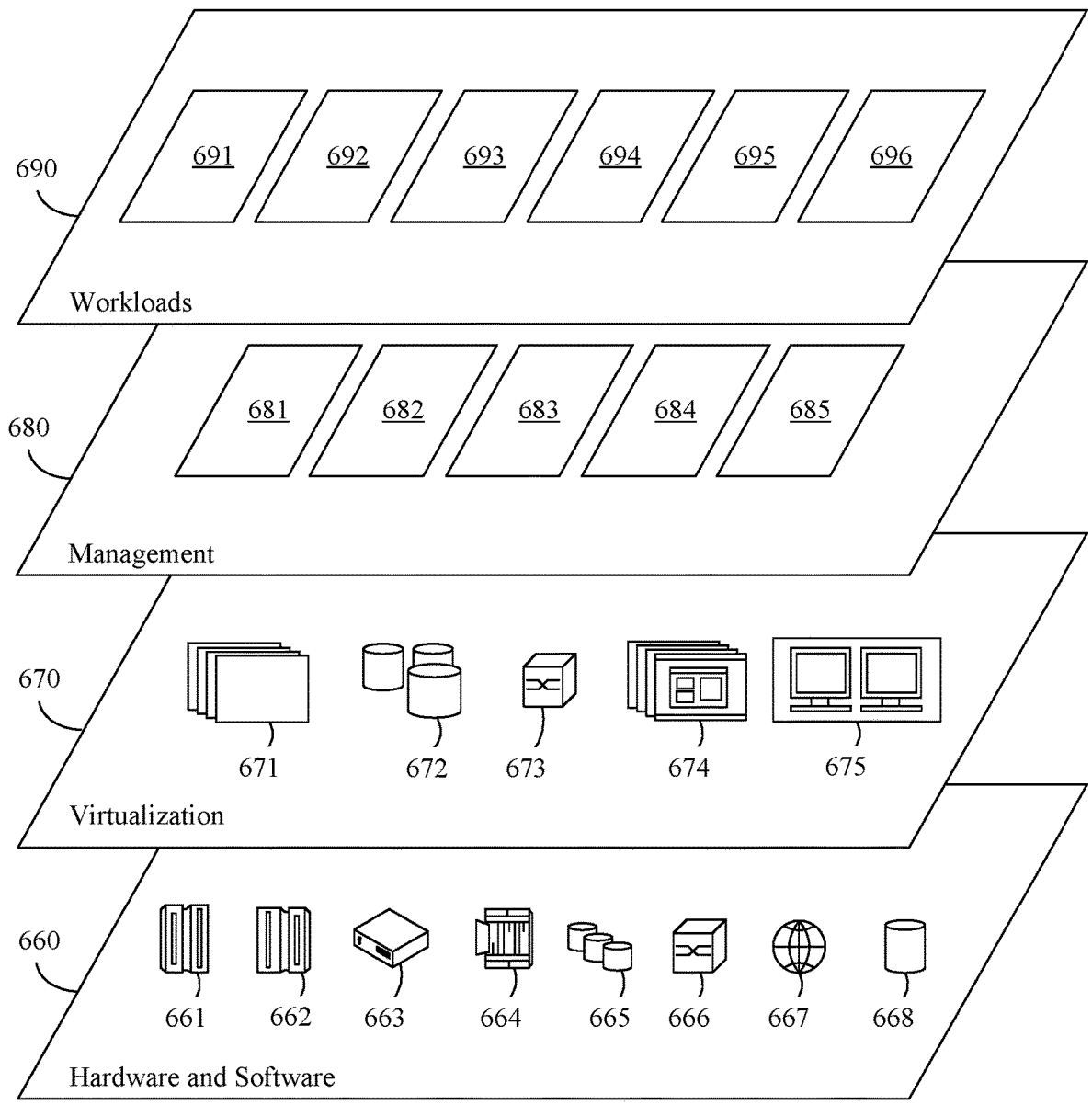
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and operations of the FSD assistive system 696.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process performed by a full self-driving (FSD) assistive system for assisting a user with a trip using a FSD autonomous vehicle, comprising:
   receiving, based upon a first user input to a computing device associated with the user, a proposed route of the trip;
   retrieving a previously-stored user profile of the user and a context of the trip;
   searching for the vehicle based upon the user profile, the proposed route, and the context;
   configuring the vehicle using the user profile;
   polling external sensors for road conditions along the route; and
   forwarding the road conditions to the vehicle, wherein
   an onboard analytics device of the vehicle uses the road conditions to change a driving mode of the vehicle, and
   the FSD assistive system is configured to map the context of the trip to a particular vehicle, wherein the FSD assistive system is configured to communicate with a third party based upon the context of the trip, and wherein the FSD assistive system is configured to identify an additional vehicle for use during the trip based upon a communication with the third party.

2. The method of claim 1, wherein
   the user profile is updated based upon data collected during the trip.

3. The method of claim 1, wherein
   the searching includes:
      the FSD assistive system identifying requirements for the trip, and
      the FSD assistive system forwarding the requirements to each of a plurality of fleets.

4. The method of claim 1, wherein
   the searching includes the FSD assistive system identifying an additional vehicle for use during the trip, the additional vehicle is also configured using the user profile, and
   the vehicle and the additional vehicle are from different fleets.

5. The method of claim 1, wherein
   the searching identifies a plurality of different vehicles to be used for the trip.

6. The method of claim 1, wherein
   the proposed route of the trip was previously-stored prior to receiving the first user input.

7. The method of claim 1, wherein
   the proposed route of the trip is generated by the FSD assistive system using a to-do list supplied by the user.

8. A computer hardware system including a full self-driving (FSD) assistive system for assisting a user with a trip using a FSD autonomous vehicle, comprising:
   a hardware processor configured to initiate the following executable operations:
      receiving, based upon a first user input to a computing device associated with the user, a proposed route of the trip;
      retrieving a previously-stored user profile of the user and a context of the trip;
      searching for the vehicle based upon the user profile, the proposed route, and the context;
      configuring the vehicle using the user profile;
      polling external sensors for road conditions along the route; and
      forwarding the road conditions to the vehicle, wherein
   an onboard analytics device of the vehicle uses the road conditions to change a driving mode of the vehicle, and
   the FSD assistive system is configured to map the context of the trip to a particular vehicle, wherein the FSD assistive system is configured to communicate with a third party based upon the context of the trip, and wherein the FSD assistive system is configured to identify an additional vehicle for use during the trip based upon a communication with the third party.

9. The system of claim 8, wherein
   the user profile is updated based upon data collected during the trip.

10. The system of claim 8, wherein
    the searching includes:
       the FSD assistive system identifying requirements for the trip, and
       the FSD assistive system forwarding the requirements to each of a plurality of fleets.

11. The system of claim 8, wherein
    the searching includes the FSD assistive system identifying an additional vehicle for use during the trip, the additional vehicle is also configured using the user profile, and
    the vehicle and the additional vehicle are from different fleets.

12. The system of claim 8, wherein
    the searching identifies a plurality of different vehicles to be used for the trip.

13. The system of claim 8, wherein
    the proposed route of the trip was previously-stored prior to receiving the first user input.

14. The system of claim 8, wherein
    the proposed route of the trip is generated by the FSD assistive system using a to-do list supplied by the user.

15. A computer program product, comprising:
    a computer readable storage medium having stored therein program code, the program code, which when executed by a computer hardware system including a full self-driving (FSD) assistive system for assisting a user with a trip using a FSD autonomous vehicle, causes the computer hardware system to perform:

receiving, based upon a first user input to a computing device associated with the user, a proposed route of the trip;

retrieving a previously-stored user profile of the user and a context of the trip;

searching for the vehicle based upon the user profile, the proposed route, and the context;

configuring the vehicle using the user profile;

polling external sensors for road conditions along the route; and forwarding the road conditions to the vehicle, wherein an onboard analytics device of the vehicle uses the road conditions to change a driving mode of the vehicle, and the FSD assistive system is configured to map the context of the trip to a particular vehicle, wherein the FSD assistive system is configured to communicate with a third party based upon the context of the trip, and identify an additional vehicle for the trip based upon a communication with the third party.

16. The computer program product of claim 15, wherein the user profile is updated based upon data collected during the trip;

the searching includes:

the FSD assistive system identifying requirements for the trip, the FSD assistive system forwarding the requirements to each of a plurality of fleets, the FSD assistive system identifying an alternative vehicle for use during the trip, and identifying a plurality of different vehicle to be used for the trip;

and the proposed route of the trip is generated by the FSD assistive system using a to-do list supplied by the user.

\* \* \* \* \*